United States Patent Office 3,733,282
Patented May 15, 1973

---

3,733,282
EPOXY RESIN MIXTURES CONTAINING HETEROCYCLIC SYSTEMS
Juergen Habermeier, Allschwil, Hans Batzer, Arlesheim, and Daniel Porret, Binningen, Switzerland, assignors to Ciba-Geigy AG., Basel, Switzerland
No Drawing. Filed Mar. 24, 1971, Ser. No. 127,766
Claims priority, application Switzerland, Apr. 1, 1970, 4,792/70
Int. Cl. C08g 45/06
U.S. Cl. 260—830 TW          5 Claims

ABSTRACT OF THE DISCLOSURE

Epoxide resin mixtures, which at room temperature are stable to storage and do not crystallise, of (a) diglycidyl ethers of binuclear 5-membered or 6-membered, unsubstituted or substituted, oxyalkylated N-heterocyclic compounds which contain two NH groups in the molecule for example 1,6 - bis(1' - glycidyloxyethyl-5',5'-dimethylhydantoinyl)-hexane, and (b) polyglycidyl compounds of the N-heterocyclic series which contain at least one heterocyclic ring, which possesses the —NH—CO— grouping at least once, with at least two glycidyl groups or β-methylglycidyl groups in the polyglycidyl compounds being linked directly to endocyclic nitrogen atoms (for example 1,3-diglycidyl-5,5-dimethylhydantoin).

BACKGROUND OF THE INVENTION

The subject of Swiss Pat. No. 510,689 are new diglycidyl compounds of the general formula:

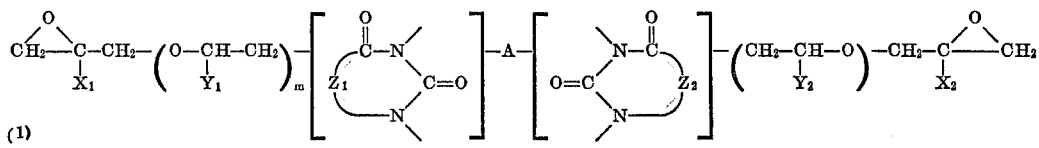

(1)

wherein $Z_1$ and $Z_2$ independently of one another each denote a nitrogen-free divalent radical which is required to complete a 5-membered or 6-membered, unsubstituted or substituted heterocyclic ring having the formulae

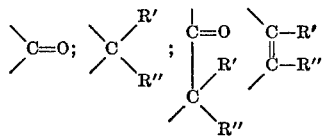

and

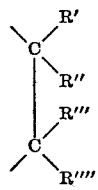

wherein R', R'', R''', and R'''' each represents a member selected from the group consisting of alkyl with 1 to 5 carbon atoms, alkenyl with 1 to 5 carbon atoms, cyclohexyl, cyclohexenyl, phenyl and substituted phenyl, or when the radical $Z_1$ or $Z_2$ represents the formula

R' and R'' together can also form a member selected from the group consisting of divalent tetramethylene and pentamethylene radical, A represents a divalent aliphatic, cycloaliphatic or araliphatic radical, and in particular preferably represents an alkylene radical, or an alkylene radical interrupted by oxygen atoms, $X_1$, $X_2$, $Y_1$ and $Y_2$ each denote a hydrogen atom or a methyl group, and $m$ and $n$ each represent an integer having a value of 0 to 30, preferably of 0 to 4, with the sum of $m$ and $n$ having to be at least 1.

The compounds of the Formula I are manufactured by reacting compounds of the general formula

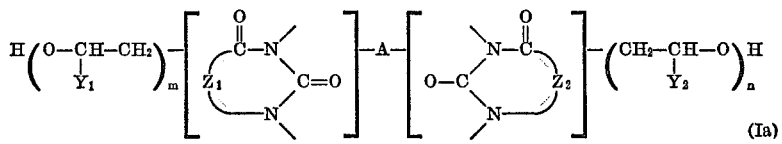

(Ia)

wherein $Z_1$, $Z_2$, A, $Y_1$, $Y_2$, $m$ and $n$ have the same meaning as in the Formula I, in one stage or several stages, with an epihalogenohydrin or β-methylepihalogenohydrin, such as, for example, epichlorohydrin, β-methylepichlorohydrin or epibromohydrin, in a manner which is in itself known.

The compounds of the Formula I can be cured with the customary curing agents for polyepoxide compounds to give moulded materials.

DETAILED DESCRIPTION

It has now been found that moulded materials of particularly advantageous properties are obtained if mixtures of epoxide compounds of the Formula I, in which the glycidyl groups are bonded to the N-heterocyclic rings via a mobile chain, and polyglycidyl compounds of the N-heterocyclic series, which contain at least one heterocyclic ring, which possesses the

grouping at least once, with at least two glycidyl groups or β-methylglycidyl groups in the polyglycidyl compounds being directly linked to endocyclic nitrogen atoms, that is to say with the glycidyl groups being directly bonded to the rigid N-heterocyclic ring, are cured with a curing agent for epoxy resins, especially with a polycarboxylic acid anhydride.

The mixtures of the abovementioned epoxide compounds are preferably liquids and are hence easily processable. If polyglycidyl compounds of the N-heterocyclic series which crystallise easily are used, they can be prevented from crystallising out of the mixture by adding a little dicarboxylic acid anhydride which effects a partial pre-addition of the glycidyl compounds. It is, however, also possible to use solvents containing epoxide groups, such as N-glycidyloxazolidin-2-ones, to prevent the crystallisation of the N-glycidyl compounds from the mixtures mentioned. The mixtures thus manufactured are liquid epoxide resins which are stable to storage and do not crystallise. It is on the other hand, however, also possible to mix the appropriate abovementioned epoxide resins only directly before adding the curing agent.

The subject of the present invention are therefore curable mixtures which are suitable for the manufacture of shaped articles, including sheet-like structures, characterised in that they contain (a) diglycidyl ethers of the general formula

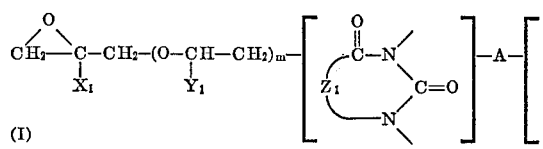

(I)

wherein $Z_1$ and $Z_2$ independently of one another each denote a nitrogen-free divalent radical which is required to complete a 5-membered or 6-membered, unsubstituted or substituted heterocyclic ring having the formula

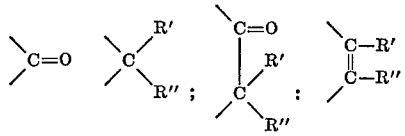

and

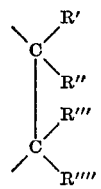

wherein R′, R″, R‴ and R⁗ each represents a member selected from the group consisting of alkyl with 1 to 5 carbon atoms, alkenyl with 1 to 5 carbon atoms, cyclohexyl, cyclohexenyl, phenyl and substituted phenyl, or when the radical $Z_1$ or $Z_2$ represents the formula

R′ and R″ together can also form a member selectel from the group consisting of divalent tetramethylene and pentaethylene radical. A represents a divalent aliphatic, cycloaliphatic or araliphatic radical, and in particular preferably represents an alkylene radical, or an alkylene radical interrupted by oxygen atoms, $X_1$, $X_2$, $Y_1$ and $Y_2$ each denote a hydrogen atom or a methyl group, and $m$ and $n$ each represent an integer having a value of 0 to 30, preferably of 0 to 4, with the sum of $m$ and $n$ having to be at least 1, (b) polyglycidyl compounds of the N-heterocyclic series which contain at least 1 heterocyclic ring which possesses the grouping

at least one, with at least two glycidyl groups or β-methylglycidyl groups in the polyglycidyl compounds being directly linked to endocyclic nitrogen atoms, and (c) a curing agent for epoxide resins, especially a polycarboxylic acid anhydride, and also, optionally, a curing catalyst.

Polyglycidyl compounds of the N-heterocyclic series (b) are conveniently obtainable according to known methods, by reaction of epichlorohydrin or β-methylepichlorohydrin with heterocyclic urea derivatives, such as, especially, cyanuric acid, ethyleneurea, hydantoin, substituted hydantoins, bis(hydantoin) compounds, uracil, substituted uracils, dihydrouracils, or bis(dihydrouracil) compounds, in the presence of suitable catalysts, for example tertiary amines.

Compounds which may be mentioned are the triglycidylisocyanurate of the formula

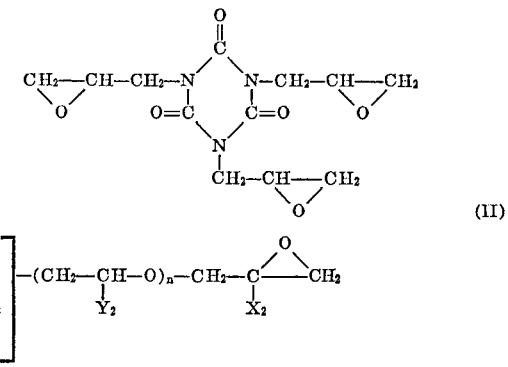

(II)

N,N′-diglycidyl-parabanic acid; N,N′-diglycidyl compounds of the formula

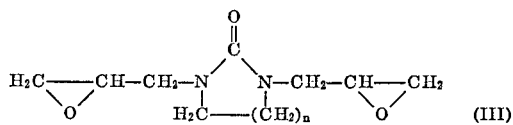

(III)

wherein $n=1$ or 2, that is to say N,N′-diglycidylpropyleneurea and above all N,N′-diglycidylethyleneurea (=1, 3-diglycidylimidazoline-2); N,N′-diglycidyl compounds of the formula

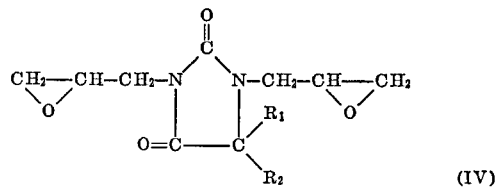

(IV)

wherein $R_1$ and $R_2$ each denote a hydrogen atom or a lower alkyl radical with 1 to 4 carbon atoms, or wherein $R_1$ and $R_2$ together form a tetramethylene or pentamethylene radical; representatives of this class of compound are, for example:

1,3-diglycidylhydantoin,
1,3-diglycidyl-5-methyl-hydantoin,
1,3-diglycidyl-5-n-propyl-hydantoin,
1,3-diglycidyl-5-methyl-5-ethyl-hydantoin,
1,3-diglycidyl-1,3-diaza-spiro(4.5)-decane-3,4-dione,
1,3-diglycidyl-1,3-diazaspiro(4.4)-nonane-2,4-dione and especially 1,3-diglycidyl-5,5-dimethyl-hydantoin as well as 1,3-diglycidyl-5-isopropoyl-hydantoin.

N,N′-diglycidyl compounds of the formula

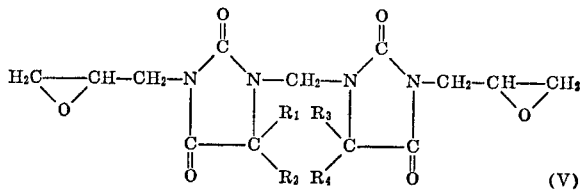

(V)

wherein $R_1$, $R_2$, $R_3$ and $R_4$ each denote a hydrogen atom or a lower alkyl radical with 1 to 4 carbon atoms, or wherein $R_1$ and $R_2$, and/or $R_3$ and $R_4$ together form a tetramethylene or pentamethylene radical; representatives of this class of compound are, for example, bis-(3-glycidyl - 5,5 - dimethyl-hydantoinyl)-1)-methane, bis-(3- glycidyl-5-methyl-5-ethyl-hydantoinyl-1) - methane and bis-(3-glycidyl-5-propyl-hydrantoinyl-1)-methane.

N,N'-diglycidyl compounds of the formula

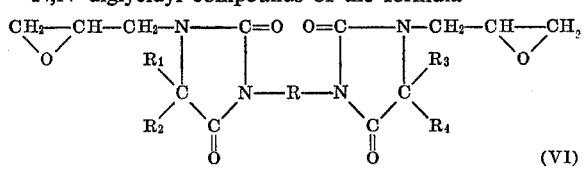

wherein R is an aliphatic, cycloaliphatic or araliphatic radical and $R_1$, $R_2$, $R_3$ and $R_4$ each denote a hydrogen atom or a lower alkyl radical with 1 to 4 carbon atoms, or wherein $R_1$ and $R_2$ and/or $R_3$ and $R_4$ together form a tetramethylene or pentamethylene radical; representatives of this class of compound are, for example, bis(1-glycidyl-5,5-dimethylhydantoinyl-3)-methane,
1,2-bis(1'-glycidyl-5',5'-dimethylhydantoinyl-3')ethane,
1,4-bis(1'-glycidyl-5',5'-dimethylhydantoinyl-3')butane,
1,6-bis(1'-glycidyl-5',5'-dimethylhydantoinyl-3')hexane,
1,12-bis(1'-glycidyl-5',5'-dimethylhydantoinyl-3') dodecane, and
β,β'-bis(1'-glycidyl-5',5'-dimethylhydantoinyl-3')diethylether.

N,N'-diglycidyl compounds of the formula

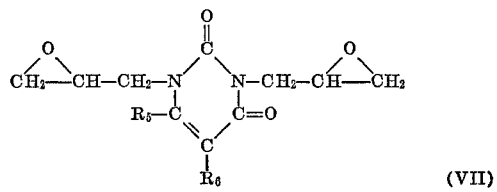

wherein $R_5$ and $R_6$ independently of one another each denote a hydrogen atom or a lower alkyl radical with 1 to 4 carbon atoms: representatives of this class of compound are, for example, 1,3-diglycidyl-uracil, 1,3-diglycidyl-6-methyl-uracil, and 1,3-diglycidyl-5-methyl-uracil.

N,N'-diglycidyl compounds of the formula

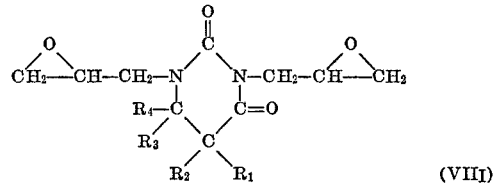

wherein $R_1$ and $R_2$ denote identical or different alkyl radicals, preferably methyl groups, and $R_3$ and $R_4$ independently of one another each denote a hydrogen atom or an alkyl radical ($R_3$ is preferably an alkyl radical with 1 to 4 carbon atoms and $R_4$ is preferably hydrogen).

Representatives of this class of compound are, for example, 1,3-diglycidyl-5,5-dimethyl-5,6-dihydro-uracil and 1,3-diglycidyl-5,5-dimethyl-6-isopropyl-5,6-dihydro-uracil.

N,N'-diglycidyl compounds of the formula

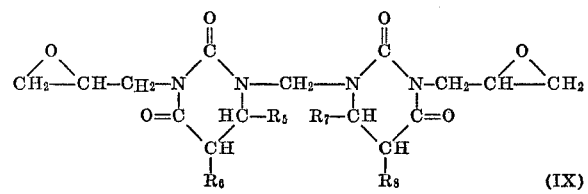

wherein $R_5$, $R_6$, $R_7$ and $R_8$ independently of one another each denote a hydrogen atom or a lower alkyl radical with 1 to 4 carbon atoms; representatives of this class of compound are, for example, 3,3'-diglycidyl-1,1'-methylene-bis(5,6-dihydrouracil), 3,3'-diglycidyl-1,1'-methylene-bis(6-methyl-5,6-dihydro-uracil) and 3,3'-diglycidyl-1,1'-methylene-bis-(5,5-dimethyl-5,6-dihydrouracil).

The mixing ratios of the two abovementioned epoxide components (a) and (b) depend on the particular end use. For many cases, mixtures of 1 mol of the epoxide compound (a) and 1 mol of the epoxide compound (b) prove the most suitable, since the shaped articles obtained therefrom by curing couple good mechanical strengths with a certain flexibility, whilst retaining good heat resistance.

However, optimum properties can also be achieved with other mixing ratios, depending on the nature of the combined resins.

The mixtures of the abovementioned epoxide compounds (a) and (b) are preferably cured with polycarboxylic acid anhydrides. However, curing with polyamines is also possible.

The curable epoxide resin mixtures can furthermore be mixed, in any stage before curing, with customary modifiers, such as extenders, fillers and reinforcing agents, pigments, dyestuffs, organic solvents, plasticisers, flow control agents, agents for conferring thixotropy flameproofing substances or mould release agents.

The curable epoxide resin mixtures according to the invention are above all employed in the fields of surface protection, the electrical industry, laminating processes and the building industry.

In the example which follows, unless otherwise stated, the parts denote parts by weight and percentages denote percentages by weight; the relationship of parts by volume to parts by weight is as of the millilitre to the gram.

Example 60 parts of 1,6-bis-(1'-glycidyloxyethyl-5',5'-dimethylhydantoinyl-3')-hexane (epoxide content 3.71 equivalents/kg.) are mixed with 27.2 parts of 1,3-diglycidyl-5,5-dimethylhydantoin (epoxide content 8.0 equivalents/kg.). A homogeneous melt is obtained by warming to 70° C., and is vigorously stirred at this temperature for some time further. After cooling, a clear, pale yellow, non-crystallising resin is obtained.

62.0 parts of hexahydrophthalic anhydride and 0.2 g. of benzyldimethylamine are added thereto and after thorough mixing the whole is poured into casting moulds made of aluminum and prewarmed to 80° C. Curing takes place in 3 hours at 80° C., 2 hours at 120° C. and subsequently 10 hours at 150° C. Pale yellow, clear, transparent mouldings having the following properties are obtained:

Tensile strength (VSM 77,101) _____kp./mm.² __ 7.08
Elongation at break (VSM 77,101) ___percent__ 2
Flexural strength (VSM 77,103) ____kp./mm.² __ 13.6
Deflection (VSM 77,103) _____mm__ 8.8
Flexural impact strength (VSM 77,105) _____cmkp./cm.² __ 10–13

We claim:
1. A composition of matter which comprises (a) diglycidyl ethers of the general formula

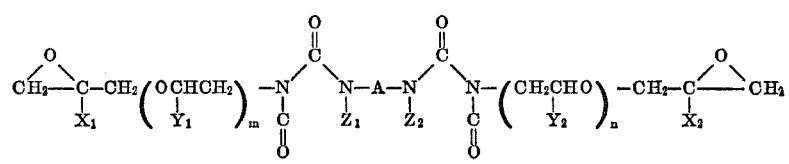

wherein $X_1$, $X_2$, $Y_1$ and $Y_2$ each represents a member selected from the group consisting of hydrogen atom and a methyl group, A represents a member selected from the group consisting of divalent aliphatic radical, divalent cycloaliphatic radical divalent araliphatic radical and alkylene radical interrupted by oxygen atoms and $Z_1$ and $Z_2$ each represents a member selected from the group consisting of a divalent radical of formulae

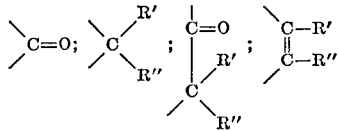

and

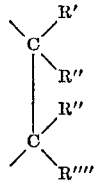

wherein R', R'', R''' and R'''' each represents a member selected from the group consisting of alkyl with 1 to 5 carbon atoms, alkenyl with 1 to 5 carbon atoms, cyclohexyl, cyclohexenyl, phenyl and substituted phenyl, or when the radical $Z_1$ or $Z_2$ represents the formula

R' and R'' together can also form a member selected from the group consisting of divalent tetramethylene and pentanethylene radical, and $m$ and $n$ each represent an integer having a value of 0 to 4, with the sum of $m$ and $n$ having to be at least 1, (b) polyglycidyl compounds of the N-heterocyclic series which contain at least 1 heterocyclic ring which possesses the grouping

at least one, with at least two glycidyl groups or β-methylglycidyl groups in the polyglycidyl compounds being directly linked to endocyclic nitrogen atoms, and (c) a curing agent for epoxide resins, especially a polycarboxylic acid anhydride, and also, optionally, a curing catalyst.

2. A composition as claimed in claim 1, which contains 1,6 - bis - (1'-glycidyloxyethyl-5',5'-dimethyl-hydantoinyl-3'-hexane as the epoxide (a).

3. A composition as claimed in claim 1, which contains 1,3-diglycidyl-5,5-dimethylhydantoin as the epoxide (b).

4. A composition as claimed in claim 1, which contains a polycarboxylic acid anhydride as the curing agent (c).

5. A composition as claimed in claim 4, which contains hexahydrophthalic anhydride as the polycarboxylic acid anhydride.

References Cited
UNITED STATES PATENTS 3,391,097  7/1968  Williamson ----- 260—309.5 X
3,449,353  6/1969  Porret et al. ------- 260—309.5

WILLIAM H. SHORT, Primary Examiner

T. E. PERTILLA, Assistant Examiner

U.S. Cl. X.R.

117—161 ZB; 260—2 Ep, 78.4 Ep